March 11, 1969 H. DYM 3,432,670

RADIATION SCANNER EMPLOYING CONSTANT CURRENT MEANS

Filed Dec. 28, 1964 Sheet 1 of 2

*INVENTOR.*
HERBERT DYM

*BY*

Joe L. Koerber
ATTORNEY

March 11, 1969 H. DYM 3,432,670

RADIATION SCANNER EMPLOYING CONSTANT CURRENT MEANS

Filed Dec. 28, 1964

Sheet 2 of 2

United States Patent Office 3,432,670
Patented Mar. 11, 1969

3,432,670
RADIATION SCANNER EMPLOYING CONSTANT CURRENT MEANS

Herbert Dym, Mahopac, N.Y., assignor to International Business Machines Corporation, New York, N.Y., a corporation of New York Filed Dec. 28, 1964, Ser. No. 421,425
U.S. Cl. 250—211 5 Claims
Int. Cl. H01j 39/12

ABSTRACT OF THE DISCLOSURE

This invention relates to scanners of patterns of radiant energy and more particularly to improved drive circuits for such scanners wherein the driving signals are isolated from the derived signals. The radiation scanner described in the disclosure includes a plurality of pairs of back to back diodes which are connected on one side to a detector circuit which is responsive to changes in current. The other side of each diode pair is connected to a voltage divider circuit which has connected thereto a constant current means for providing a constant bias voltage across the voltage divider. A drive signal is also connected to the voltage divider circuit. At least one diode in each pair has photoconductive properties. When radiation is directed at one or more of the diode pairs, they tend to conduct, however, they are prevented from conducting by the fact that one diode in each diode pair is back-biased. The drive signal varies in time and overcomes the back bias of each diode pair in sequence, thereby allowing the diode pairs exposed to the radiation to conduct. The detection circuit is isolated from the drive signal and bias signal and, therefore, noise is eliminated from the detected signal.

A general problem in a class of devices which require driving signals and power sources is that the driving signals and power supplies introduce noise signals which interfere with derived information signals. In some instances the signal-to-noise ratio may merely make discrimination between noise signals and data signals difficult whereas in other instances the noise signals may be of such magnitude as to completely obliterate some data signals and, in certain modes of operation, actually indicate data of an opposite type, for example, indicating that a data bit is present whereas it may actually be absent.

A basic radiation scanner is shown in the commonly assigned U.S. Patent 3,317,733, entitled, "Radiation Scanner," issued May 2, 1967, on behalf of John W. Horton and Robert J. Lynch and assigned to the assignee of the present application. The present invention is an improvement over the radiation scanner shown and described in the above-cited application.

An object of the present invention is to provide an improved radiation scanner.

Another object of the present invention is to provide an improved radiation scanner having the driving signals isolated from the derived signals.

A further object of the present invention is to provide an improved biasing for a radiation scanner.

Yet another object of the present invention is to provide improved circuitry for a radiation scanner which balances the effect of the power supply output impedance.

A feature of this invention is the removal of the driving signal source from the signal detector side of the circuit to the opposite side whereby the desired isolation is achieved due to the high impedance of the intervening circuitry.

Another feature is providing a constant voltage bias through use of a constant current source.

A further feature is a scanner device having the bias supply and the driving signals applied to the voltage divider side of the device.

The foregoing and other objects features and advantages of the invention will be apparent from the following more particular description of preferred embodiments of the invention, as illustrated in the accompanying drawings.

In general, the device consists of a series of pairs of back-to-back diodes common connected at one side to a detector circuit which is responsive to changes of current in the common connected circuit. The other side of each diode pair is connected in a voltage divider circuit having a fixed bias. An alternating drive signal is applied such that the potential of the voltage divider circuit floats with the drive signal. At least one diode of each pair has photoconductive properties.

Radiation is directed at the device and, during each cycle of the driving signal, output signals are derived which indicate which diode pairs have a photodiode which is exposed to the radiation. The diode pairs are arranged sequentially and the bias provided by the voltage divider is such that the output signals from the diode pairs are produced in a time sequence as the driving signal changes in a given direction.

If the voltage divider is linear whereby the bias applied to each successive diode pair differs by a fixed increment from the preceding one, and if the driving signal is a linear ramp signal, the output signals from the device will be linearly spaced in time.

Figure 1:
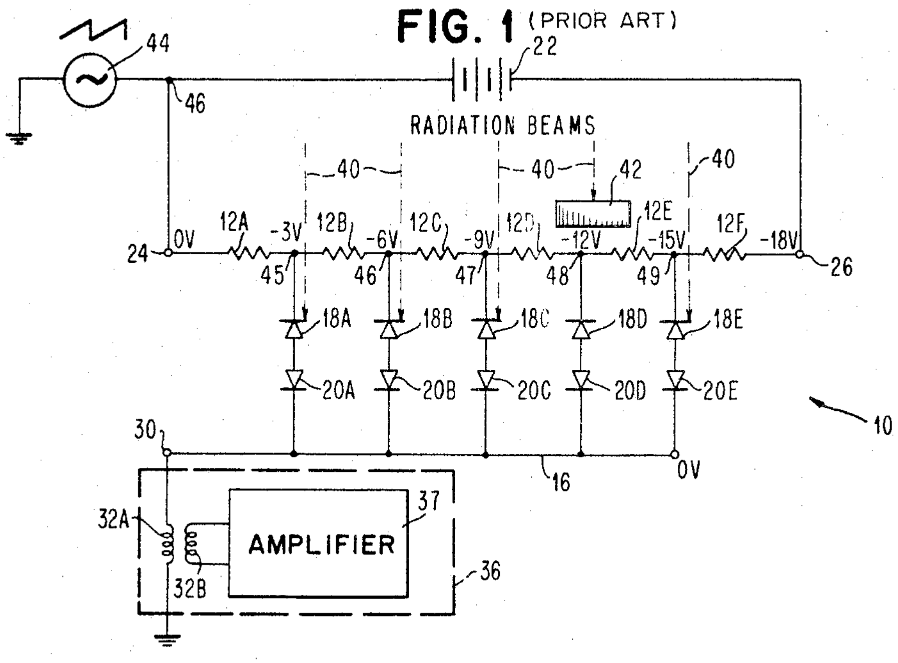
FIG. 1 (PRIOR ART)
FIG. 1 is a schematic illustration of one embodiment of the radiation scanner.

Referring to FIG. 1 there is shown a scanner structure generally designated 10. A voltage divider generally designated 12 includes a number of series connected resistor elements 12A–12F, a group of photodiodes 18A–18E, a group of diodes 20A–29E, and a bus 16. Corresponding diodes 18 and 20 are connected back-to-back with the other terminal of all diodes 20 being connected to bus 16 and the other terminal of diodes 18 being connected to taps of the voltage divider 12. A source of bias voltage such as a battery 22 is connected across the voltage divider 12 at points 24 and 26. The bus 16 is connected at point 30 through a coil 32A of a detector unit 36 to ground. The unit 36 is responsive to transient changes produced across the coil 32A during operation of the device. The detector unit 36 includes an amplifier 37 coupled to the coil 32A by a coil 32B.

The photodiodes 18 are exposed to radiation which is illustrated as discrete beams of light, as indicated by arrows 40 although the device could be flooded with light rather than by use of discrete beams. One of the beams is obstructed by an opaque object 42. An alternating drive signal generator which is illustrated as a ramp voltage generator 44 is connected at a point 46 between the battery 22 and the connection point 24 on the voltage divider 12. Each transition of the ramp voltage causes sequential changes in current in the bus 16, corresponding to each of the light beams 40 except the one which is blocked by the opaque object 42. Each of these changes causes a transient change in the voltage across the coil 32A which is amplified by the amplifier 37.

The bus 16 is effectively connected through coil 32A to ground and thus may be considered as biased to 0 volts. At the same time, the voltage from source 22 is divided through the voltage divider 12 to provide a series of different voltage values at the diodes 18A–18E. For example, the battery 22 may have a value of 18 volts with the plus terminal effectively connected to ground through the generator 44. Thus, the left-hand end of the voltage divider 12 will follow the applied ramp voltage and will correspond at all times to the voltage of the applied ramp.

Assuming a ramp voltage varying from 0 to +18 volts, the left-hand end of the voltage divider 12 will vary from 0 volts, when the ramp is at 0, to +18 volts when the ramp is at its maximum. Similarly, the right-hand end will vary from —18 volts, when the ramp is at its lowest point, to 0 volts when the ramp is at its highest point. For illustration purposes, it is assumed that there is a three volt difference between adjacent pairs of points connecting the voltage divider elements 12A–12F. Thus, with the ramp at 0 volts, points 24, 45, 46, 47, 48, 49 and 26 have the voltage values of 0, —3, —6, —9, —12, —15 and —18 respectively. As the ramp voltage rises, the potential at each of these points follows.

Figure 5:
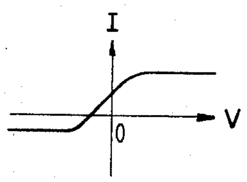
FIG. 5 illustrates the current-voltage curve of a diode pair.

Referring to FIG. 5, a current-voltage curve of a diode pair is shown. In the initial state with the non-photoconductive diode back biased and the photodiode forward biased and illuminated, the leakage current is small. At this point it will be understood that the current is not dependent upon the state of illumination of the photodiode since it is forward biased. As the voltage rises toward the null point (0 volts), the current increases rapidly as illustrated. It is this rapid change of current which is detected.

With light impinging on photodiodes 18A, 18B, 18C and 18E but not on 18D, the following conditions exist. The diodes 20A, 20B, 20C, 20D and 20E are back biased due to the 0 potential applied to the bust 16 and the relatively negative voltages applied to corresponding points 45–49 in the voltage divider 12. The photodiodes 18A, 18B, 18C, 18D and 18E are forward biased. In this state, the diodes 20 are conducting only leakage current in their back biased direction which current is very small relative to the current which the diodes can conduct when in the forward biased state. Consequently the photodiodes 18 are conducting the leakage current of the corresponding diodes 20. As the ramp voltage from generator 44 rises from 0 to its maximum value of 18 volts, the voltages at the points 45–49 rise with the ramp whereby the voltages at the points 45–49 successively reach a potential of 0 volts (null potential) and the back biased states of the diodes 20A, 20B, 20C, 20D and 20E change sequentially in that order to a forward biased state in which a large current may be conducted. At the null potential, the corresponding photodiodes 18 change to a back biased state in which they normally will conduct only leakage current but, when they are illuminated in the back biased state there is an increase in the current which is directly proportional to the light incident on the diode. As each diode 20 having a corresponding illuminated diode 18 becomes forward biased, a large change is observed in the current flowing through the coil 32A. The magnitude of the current change as the null point passes a pair of brightly illuminated diodes has been observed in some instances to be in the range of 1000:1 over the dark current. Thus, as the ramp passes the value of approximately 3 volts, the bias across the diode pair 18A–20A reverses and the current flowing through the diode pair 18A–20A changes significantly. As the ramp rises further and passes the value of approximately 6 volts, the diode pair 18B–20B changes from low current conduction to high conduction. Similarly, the current change is observed through the diode pair 18C–20C when the ramp passes a value of 9 volts. When the ramp passes a value of 12 volts, the back biased state of the diode 20D changes to a forward bias state and the diode 18D becomes back biased. Since the diode 18D is not illuminated it conducts only small leakage current. Thus, the change in current in diode pair 18D–20D is small relative to the change observed with diode pairs 18A–20A, 18B–20B and 18C–20C. As the ramp passes a value of 15 volts the change in current through the diode pair 18E–20E is observed.

Since there was initially only the leakage current flowing in the unilluminated diode pair, when the null point passes, there is no substantial change in current since the diode pair merely changes from conducting leakage current in one direction to conduction leakage current in the opposite direction.

Figure 6:
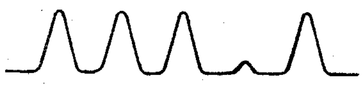
FIG. 6 illustrates the output signal pattern of the devices shown in FIGS. 1, 2, 3 and 4.

FIG. 6 illustrates the output pulses derived by the detector 36. The peaks represent the derivative of the current through the coil 32A as the voltage there across changes. Counting from the left, the first, second, third and fifth peaks represent the signals derived as the null point passes diodes 18A, 18B, 18C and 18D respectively. The small peak represents the change in current as the diodes 18D and 20D change their bias state.

Figure 3:
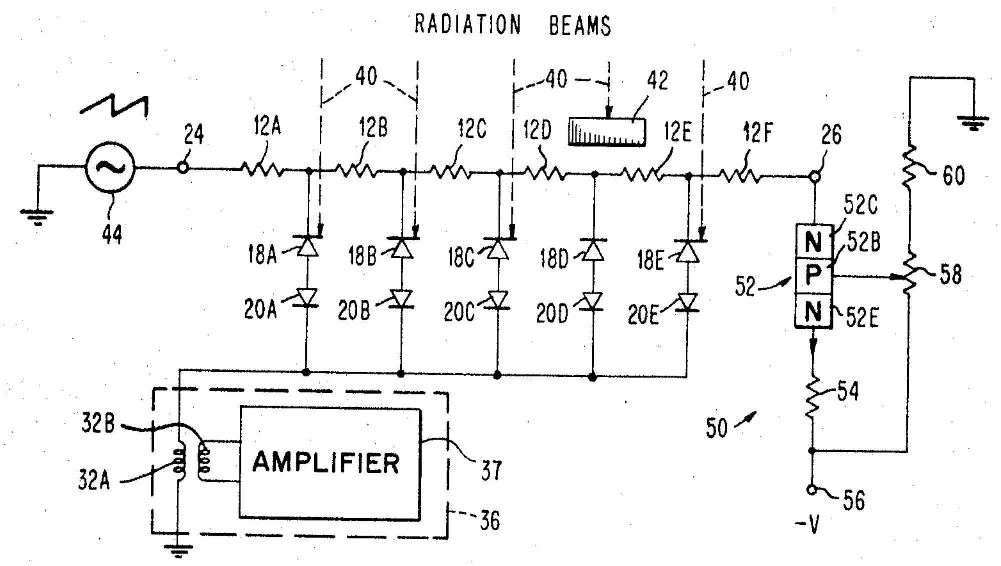
FIG. 3 is a schematic illustration of the device using a constant current source as a bias supply.

Referring to FIG. 3, a modification of the circuit shown in FIG. 1 is illustrated wherein corresponding parts have corresponding numbers. The configuration shown in FIG. 3 differs from that shown in FIG. 1 in that the battery 22 in FIG. 1 has been removed and a transistor circuit generally designated 50 has been substituted. This circuit consists of an NPN transistor 52 having its collector 52C connected to the end of resistor 12F, and having its emitter 52E connected through a resistor 54 to a negative potential represented by a terminal 56. While an NPN transistor is shown, it will be apparent that a suitable circuit could be provided using a PNP transistor. The junction between the resistor 54 and the negative potential source 56 is connected through a variable resistance 58 and a resistor 60 to ground. The base 52B of transistor 52 is connected to the moveable terminal of the variable resistance 58. The variable resistor 58 is for the purpose of making initial adjustment. The transistor circuit 50 is superior to the battery 22 since the voltage of the battery will drop as the battery ages and periodic replacement is required. The transistor circuit 50 acts as a constant current source and when connected as shown produces a constant voltage bias on the voltage divider comprising the resistors 12A–12F.

The left-end of the voltage divider is connected to the sweep voltage generator 44. In this way the voltage divider 12 floats with the sweep voltage while maintaining the necessary voltage gradient without the use of a separate supply such as the battery 22. This circuit still isolates the detector 36 from the noise associated with the driver and bias circuitry.

The regulation of the voltage in this circuit is the ratio of voltage divider resistance, $R_B$, to the transistor output impedance. This regulation is better than 0.1 percent with available devices and is an insignificant variation for many applications.

Figure 4:
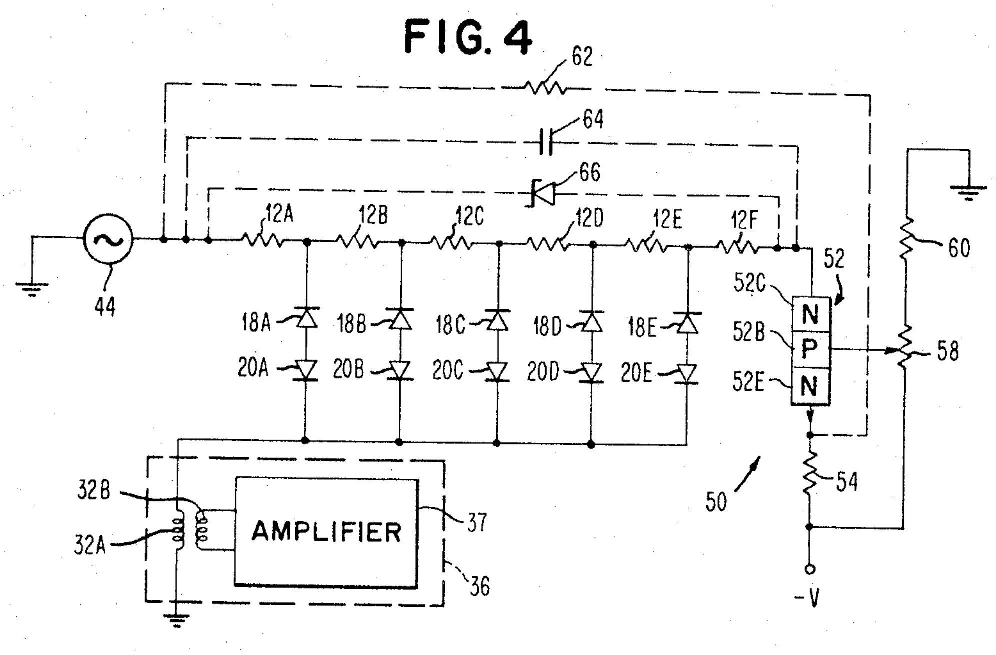
FIG. 4 is a schematic illustration showing modifications to the circuit of FIG. 3.

Referring to FIG. 4, other modifications to this circuit of FIG. 3 are shown which may be used to improve operation. For example, if even the small variation in the regulation of the voltage should prove undesirable, the current through the voltage divider can be made precisely constant by the addition of a resistor 62 connected between the sweep generator 44 and the transistor emitter 52E as shown. An appropriate size resistor will exactly cancel the effect of the transistor output impedance.

The circuit illustrated in FIG. 3 provides one path for the photo-current through the voltage divider 12, thus increasing the effective series resistance. When a lower resistance is desired, a capacitor 64 may be placed in parallel with the voltage divider as illustrated in FIG. 4, providing an alternating current path at each end of the divider as exists with a floating supply such as the battery 22.

During operation of the circuit, the resistance of the voltage divider 12 may change due to heating, for example, whereby the voltage drop across the divider and consequently at all points within the divider would change. Referring to FIG. 4, a Zener diode 66 may be connected across the voltage divider. This type of diode holds a relatively constant voltage over a wide range of currents and compensates for changes of resistance whereby the voltage drop across the divider 12 remains constant.

While the circuit has been illustrated in FIGS. 1, 3 and 4 as consisting of discrete diodes 18 and 20, discrete resistors 12A–12F and a bus 16, it may also consist of the type of three layer semiconductor wafer illustrated in aforementioned application Ser. No. 279,531. This type of embodiment is illustrated in FIG. 2 where the various elements have numbers corresponding to elements in FIGS. 1, 3 and 4.

Figure 2:
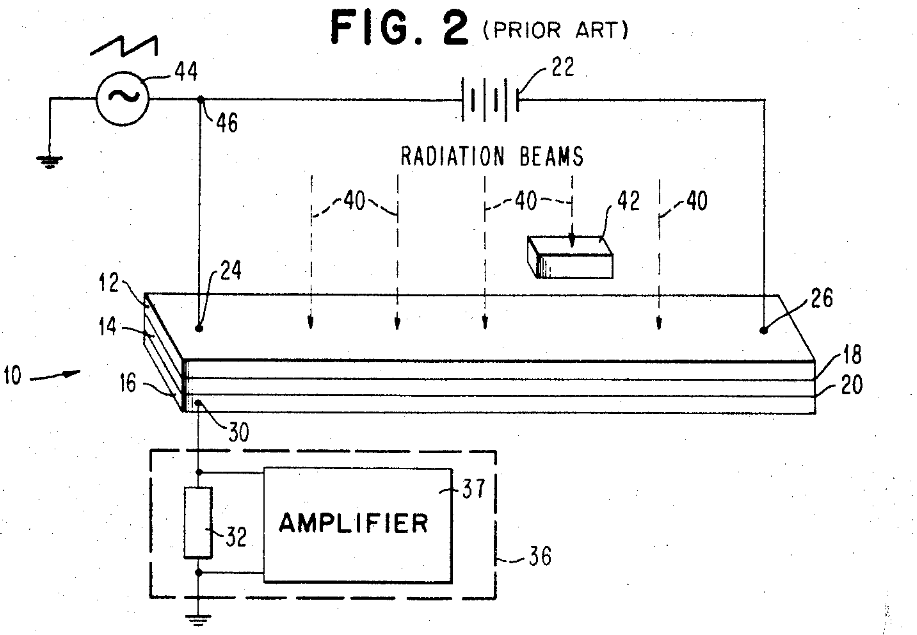
FIG. 2 (PRIOR ART)
FIG. 2 illustrates a radiation scanner utilizing a three layer semiconductor wafer.

In the embodiment of FIG. 2, the upper layer 12 is resistive and serves as a linear voltage divider. The lower layer 16 is conductive and serves as a bus. The diodes 18 and 20 are formed at junctions of the layers 12 and 16 and a middle layer 14 as described in the above-identified application. Where continuous junctions 18 and 20 are formed, the discrete diode pairs are simulated by the application of discrete radiant beams.

Alternatively, discrete diodes may be formed between layers 12 and 16 by known techniques which produce in excess of two hundred discrete diodes per linear inch.

While the embodiments of FIGS. 1, 3 and 4 show coils 32A, 32B for coupling the amplifier to the circuit, any suitable means for differentiating the current may be utilized without departing from the scope of the invention. The only limitation on the detector is that it be capable of detecting a change in current in the bus 16.

While the invention has been particularly shown and described with reference to preferred embodiments thereof, it will be understood by those skilled in the art that various changes in form and details may be made therein without departing from the spirit and scope of the invention.

What is claimed is:

1. A radiation scanner device comprising:

a succession of pairs of diodes, each pair comprising a first diode and a second diode, each diode being normally asymmetrically conductive and having a first side of one polarity designation and a second side of another polarity designation with at least one said diode of each pair being a photodiode, the diodes of each pair being connected in series with said first side of said first diode connected to said first side of said second diode, conductor means commonly connecting said second side of said first diode of each said pair to a bias voltage level, a voltage divider means comprising a succession of voltage taps separated by resistance elements, each of said succession of taps corresponding to one of said succession of pairs of diodes, means connecting said second side of said second diode of said succession of pairs of diodes to said corresponding taps of said voltage divider means, constant current means connected to said voltage divider means for maintaining a constant voltage drop across said voltage divider means, said constant current source including an NPN type transistor having its collector connected to one of two ends of said voltage divider means, its emitter connected to a bias potential and its base connected to bias circuitry which causes said transistor to pass a constant current through its collector as the collector voltage varies, and a resistance element connected between said other end of said voltage divider means and said emitter of said transistor, detector means coupled with said conductor means and operative to detect changes of current in said conductor means, and means connected to the other side of said voltage divider means for applying a progressively changing voltage to said voltage divider means such that the potential of said voltage taps follows said progressively changing voltage.

2. The device of claim 1 including at least one impedance element connected across said voltage divider means and a resistance element connected between said other end of said voltage divider means and said emitter of said transistor.

3. The device of claim 2 wherein said impedance element is a capacitor.

4. The device of claim 2 wherein said impedance element is a Zener diode.

5. The device of claim 2 wherein said at least one impedance element is a capacitor and a Zener diode connected in parallel across said voltage divider means.

References Cited

UNITED STATES PATENTS

| | | | |
|---|---|---|---|
| 2,922,986 | 1/1960 | Chynoweth ------ | 250—83.3 X |
| 3,210,548 | 10/1965 | Morrison. | |
| 3,300,655 | 1/1967 | Rosenbluth. | |
| 3,317,733 | 5/1967 | Horton et al. | |

OTHER REFERENCES

Terman: Electronic and Radio Engineering, 4th ed., 1955, pp. 74–75 relied upon.

RALPH G. NILSON, *Primary Examiner.*

T. N. GRIGSBY, *Assistant Examiner.*

U.S. Cl. X.R.

250—83.3, 207, 209, 231; 307—311; 323—4